United States Patent [19]
Dravnieks

[11] 3,902,851
[45] Sept. 2, 1975

[54] METHOD OF DETECTING ODORS AND APPARATUS THEREFOR

[75] Inventor: Andrew Dravnieks, Park Forest, Ill.

[73] Assignee: Fats and Proteins Research Foundation, Inc., Des Plaines, Ill.

[22] Filed: Jan. 9, 1974

[21] Appl. No.: 432,032

[52] U.S. Cl. ............... 23/254 R; 23/232 R; 23/259; 73/421.5 R
[51] Int. Cl.² ...................... G01N 1/26; G01N 1/22
[58] Field of Search .......... 23/232 R, 254 R, 230 B, 23/232 E, 254 E, 259; 73/421.5 R, 23

[56] References Cited
UNITED STATES PATENTS

| | | | |
|---|---|---|---|
| 3,763,877 | 10/1973 | Lieb | 23/254 R |
| 3,785,774 | 1/1974 | Murphy | 23/254 E |
| 3,815,405 | 6/1974 | Dravnieks | 23/232 R |
| 3,824,079 | 7/1974 | Venema | 23/254 E |

Primary Examiner—R. E. Serwin
Attorney, Agent, or Firm—Olson, Trexler, Wolters, Bushnell & Fosse, Ltd.

[57] ABSTRACT

Odor detecting apparatus comprises a container for holding a sample of the material to be tested, a pump for withdrawing portions of the sample, and a device for presenting the sample material to the nose of a test panel member. The apparatus also includes a second pump for delivering samples of an odorless material for comparison with the sample material.

11 Claims, 5 Drawing Figures

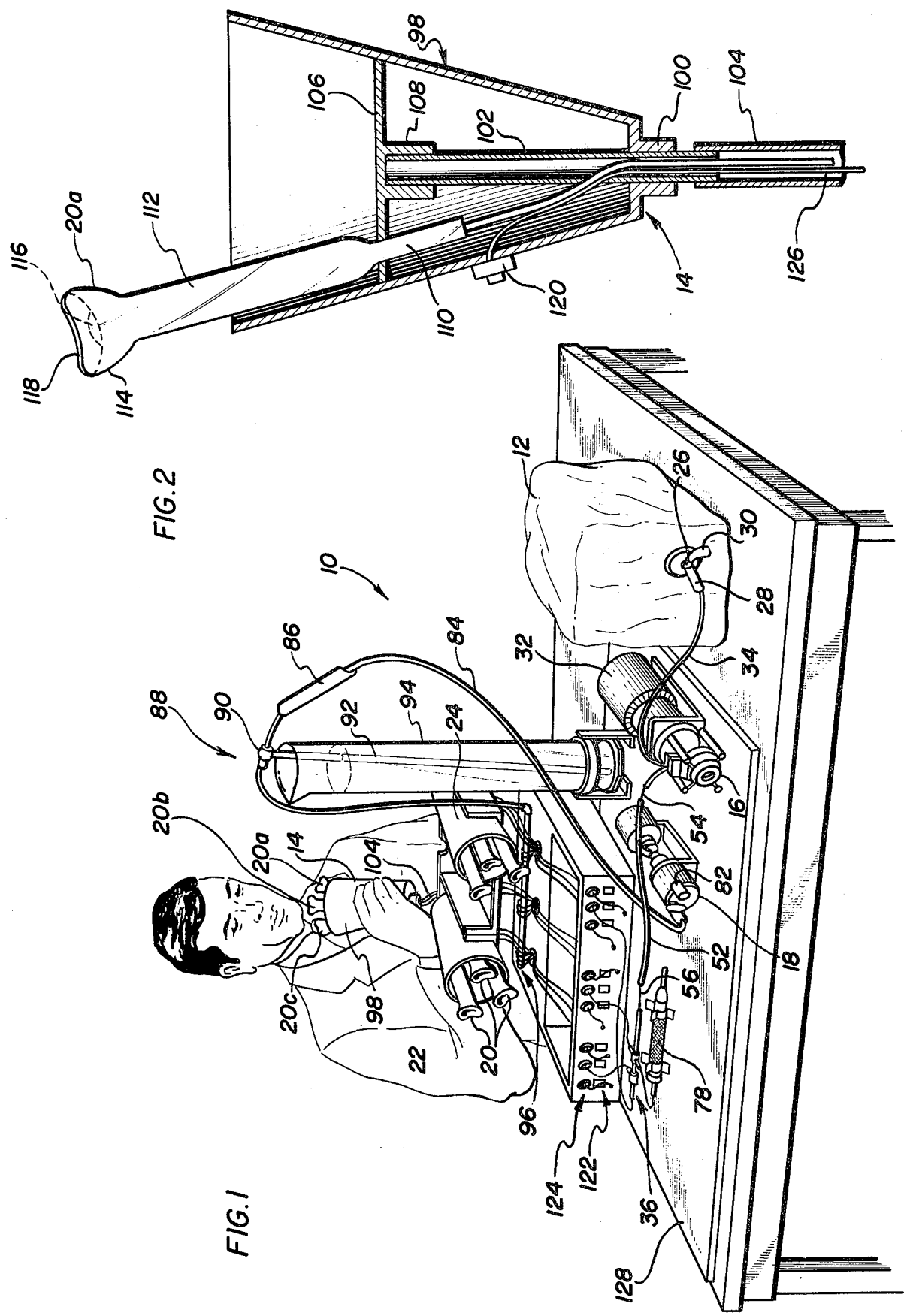

3,902,851

METHOD OF DETECTING ODORS AND APPARATUS THEREFOR

BACKGROUND OF THE INVENTION

This invention relates generally to the art of sensory testing and more particularly to apparatus for use in detecting odors.

The particular bodily cells that perceive odors are located near the top of the nasal cavity, quite close to the septum. As the ordinary process of breathing does not draw air over these regions, they soon would become dry and insensitive. By flaring the nostrils and sniffing, however, the inspired air is passed directly over the olfactory region where the conditions are optimum for discriminatory smelling. Since smell is a chemical sense, contact is necessary for perception; and the substance to be smelled must impinge on the moist surface of the olfactory region and dissolve. Since olfactory nerves are quickly fatigued, protracted smelling of any one substance will exhaust the power to recognize it, but the nerve endings may be easily rehabilitated by the breathing of fresh air again. Each odor has a threshold value depending on its intensity and volatility.

Because of the existence of sensory fatigue, equipment for use in evaluating odors has commonly provided for dilution of the samples of material. However, the means employed in the past for effecting dilution and the manner of presenting the diluted samples to the test panelists have resulted in time-consuming test procedures. Many of the methods employed heretofore have also permitted interaction between the panel leader and the individual panelists allowing the transmission of clues and thereby producing faulty results.

Accordingly, an important object of the present invention is to provide apparatus for detecting odors in a fast, reliable manner.

A more general object of the invention is to provide a new and improved olfactometer.

These and other objects and features of the invention will become more apparent from a consideration of the following descriptions:

BRIEF DESCRIPTION OF THE DRAWINGS

In order that the principles of the invention may be readily understood, a single embodiment thereof, but to which the application is not to be restricted, is shown in the accompanying drawings wherein:

FIG. 1 is a perspective view of the olfactometer of the invention;

FIG. 2 is an enlarged, central sectional view of a gas-sampling cup device for use in the olfactometer of FIG. 1;

DETAILED DESCRIPTION OF THE DRAWINGS

Figure 3:
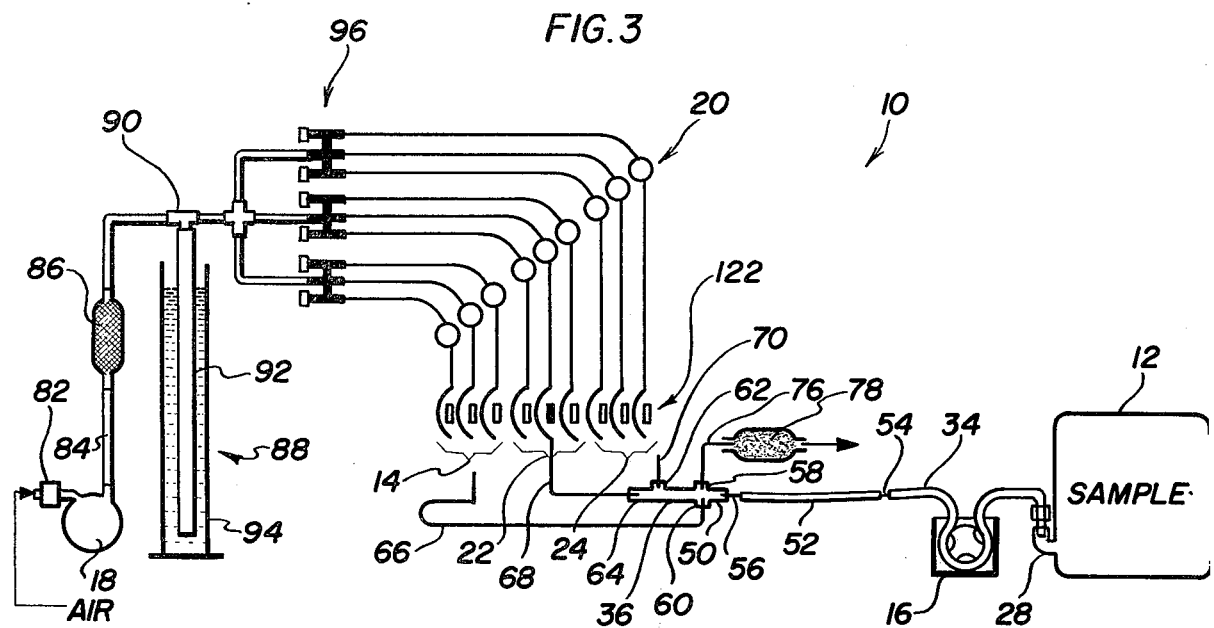
FIG. 3 is a schematic drawing of the apparatus of FIG. 1.

Referring now in detail to the drawings, specifically to FIG. 1, olfactometric apparatus indicated by the reference numeral 10 generally includes a container 12 providing a source of fluid to be tested, a manually held odor sampling unit 14, a first pump 16 for delivering sample material from the container 12 to the odor sampling unit 14, and a second pump 18 for delivering a standard or control fluid to the unit 14 for comparison with the sample fluid. In compliance with the present invention, odor judgments are made using a double-comparison sample presentation; and for this purpose, the odor sampling unit 14 includes three sniffing port elements 20a, 20b and 20c, the three port elements 20 being arranged in a symmetrical pattern at the apexes of an equilateral triangle in order to eliminate positional clues. In further accord with the principles of the present invention, a multiplicity of sample dilution levels are presented to a test panel member for judgment at a single evaluation incident. Therefore, the apparatus 10 is advantageously arranged to include additional odor sampling units 22 and 24, each of which includes three respective sniffing port elements, all of which are otherwise constructed and configured in a manner similar to the odor sampling unit 14. As will be described more fully hereinafter, each of the odor sampling units 14, 22 and 24 is arranged to present a different sample dilution level for judgement by the test panel member.

The fluid material to be odor tested by the olfactometric apparatus 10 is commonly the gaseous waste effluvium from industrial establishments such as, for example, rendering plants, and may, of course, contain entrained or condensible liquid. The present apparatus relies on the ability of test panel members to detect threshold levels of an odorant sample and is based on the assumptions, first, that the goal or target of plant operation is an odorless discharge and, second, that this target is to be achieved ultimately by dilution with atmospheric air, preferably after the effluvium has been treated with emission control equipment.

For facility in obtaining an effluent sample, the container 12 comprises a collapsible, cubical bag having a suitable volumetric content and being fabricated from an inert film material such as polyethylene. The container or bag 12 is desirably fashioned to include an integral faucet valve 26 having a single inlet-outlet tubulation 28 and a manual valve-operating handle 30.

In collecting an effluent sample, the bag container 12 is collapsed by hand with the valve 26 in the open position whereby to discharge the contents; and thereafter, effluent fluid is pumped into and exhausted from the container bag one or more times to wash the interior. Next, the effluent material is pumped into the bag container and the valve 26 closed to retain undiluted gaseous material for subsequent evaluation.

It is important that a continuous, uniform volumetric flow of sample effluent be delivered toward the odor sampling units 14, 22 and 24; and accordingly, the pump 16 is selected to be a peristaltic pump driven at a constant speed by a continuously operable gear motor 32. A selected length of flexible, inert tubing 34 connects the container bag 12 with a cross-type connector or flow splitter 36 which leads to the odor sampling units 14, 22 and 24, the tubing 34 being threaded through the operating head of pump 16 to be selectively engaged by the equiangularly disposed roller elements which are rotated therein in compliance with conventional design. The tubing 34 is selected to be inexpensive and therefore disposable so that residual quantities of a given effluent sample will not tend to contaminate successive samples passed to the odor sampling units.

Figure 5:
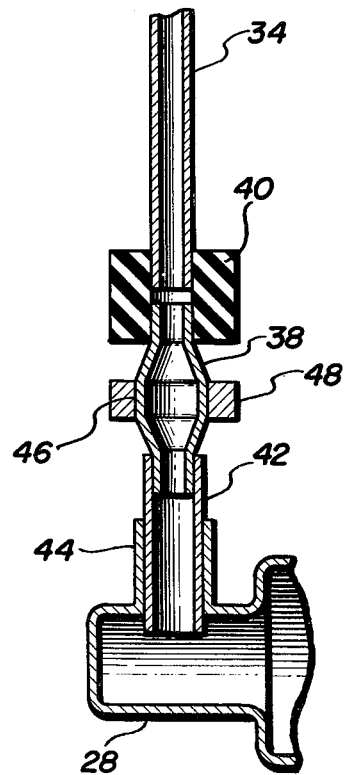
FIG. 5 is an enlarged detail drawing in cross-section showing the connector for attaching disposable pump tubing to the container for gas to be tested.

Turning to a consideration of FIG. 5 for a description of the connection between the tubing 34 and the inlet-outlet tubulation 28 of the bag container 12, a tubular connector 38 of a suitable, inert, rigid material such as stainless steel or glass is joined end-to-end with the suction end of tubing 34 by a neoprene rubber sleeve 40. The end of connector 38 which is remote from the tubing 34 is inserted in a hollow cylindrical stub section 42 of the same material as tubing 34 for example; and the otherwise free end of the stub section 42 is invaginated into a lateral branch 44 of the tubulation 28. The connector 38 is conveniently provided with a radially enlarged barrel or mid-section 46, the tapered leading and trailing end portions of which provide respective stops for the rubber sleeve 40 and the stub tubing section 42. An annular elastomeric member 48 encircles the barrel 46 of connector 38 to provide a bumper; and the internal diameters of the ends of connector 38 are selected to match the internal diameter of the tubing 34 to promote uniformity in the flow of the effluent sample.

Diluting a given effluent sample to various predetermined levels facilitates the determination of the odorant threshold. Accordingly, the apparatus of the present invention advantageously includes means for dividing the output flow from pump 16 into different volumetric fractions. For this purpose, the apparatus of the present invention includes the cross-type connector or splitter 36; and considering FIGS. 1 and 3, the positive pressure end of the pump tubing 34 is connected to an inlet element 50 of connector 36 by means of a length of thin wall spaghetti tubing 52 and a pair of unthreaded stainless steel nipples 54 and 56.

In the illustrated embodiment, the flow splitting connector 36 is configurated with four branch outlets 58, 60, 62 and 64 in addition to the inlet line 50. Furthermore, the split ratios for the effluent sample are attained by employing different, predetermined lengths of capillary tubing of uniform inside diameter, specifically capillary tubing sections 66, 68 and 70. These tubing sections are joined to the connector 36 respectively at the branch lines 60, 64 and 62, as is best seen in FIG. 3. In one specific embodiment of the invention, the capillary tubing sections 66, 68 and 70 have been selected to supply, in turn, one, three and nine ml./min. of the effluent sample from the bag container 12 to the desired port elements of the sampling units 14, 22 and 24; and when each of these olfactometer port elements 24 receives, in addition, 600 ml./min. of dilution air, for example, dilution ratios of 1:600, 1:200 and 1:68 result. When higher dilution ratios are required, a flow-restricting attenuator may be inserted in series fluid circuit between the pump 16 and the flow-splitting connector 36.

Figure 4:
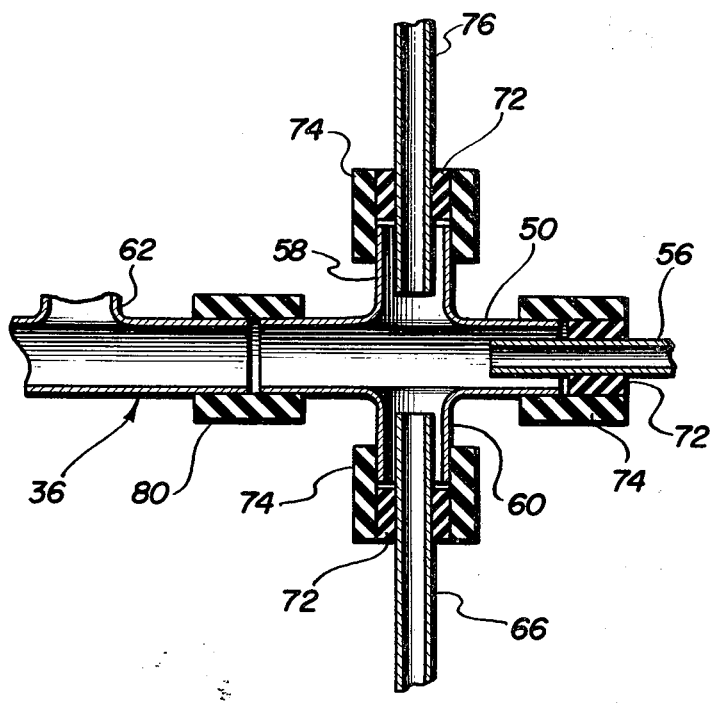
FIG. 4 is an enlarged detail drawing in cross-section showing the cross-type connector used in the olfactometer of the invention for splitting and diluting the flow of gaseous sample.

Turning briefly to FIG. 4 for a description of the manner of connecting the capillary tubing sections to their respective branch lines of splitter 36, a short resilient sleeve 72 is assembled over the end of the rigid capillary tubing section which is to be joined to the splitter 36, and a resilient outer sleeve 74 of neoprene rubber or other suitable material is stretched over the sleeve 72 and a corresponding end of the respective branch line, the capillary tubing section being inserted deeply in the branch line, in order to provide direct flow into and out of the capillary tubing section and reduce the contact between the flowing gas and those areas of the sleeves 72 and 74 which are exposed interiorly of the splitter 36. Similar connections are made at the nipple 56 and at a capillary tubing section 76 which exhausts excess effluent from the splitter 36. Advantageously, the capillary tubing section 76 empties through an activated carbon absorber 78, shown in FIGS. 1 and 3. Absorber 78 traps odorous components and prevents undesirable room air contamination. When the splitter 36 consists of a cross-fitting and a separate tee fitting, the respective fitting components are connected by a resilient, overlapping sleeve 80 as is shown in FIG. 4.

Dilution air for the odor sampling units 14, 22 and 24 is drawn from the atmosphere through a throttling needle valve 82 by the pump 18 in accordance with the showing of FIGS. 1 and 3. The pump 18 itself may comprise a suitably energized carbon vane pump or piston pump as is desired; and the air flow from pump 18 passes through a length of flexible, inert plastic tubing 84 and an inline carbon bed absorber 86 which serves to deodorize the diluent air. The air flow from absorber 86 is delivered to a water-column manostat 88, the manostat 88 comprising a tee fitting 90 which is connected to the outlet of absorber 86 and which opens into a conduit 92 that is immersed to a selected depth in water contained in a vertical, open upper ended cylinder 94. The valve 82 is adjusted so that excess diluent air normally escapes from the immersed lower end of conduit 92 so as to establish a constant air pressure in the tee fitting 90. The regulated flow of deodorized air from the fitting 90 is passed to a nine-branch manifold arrangement 96 from whence it is passed to each of the sniffing port elements 20 of the odor sampling units 14, 22 and 24.

With reference to FIG. 2, a typical odor sampling unit for use in the instant olfactometer comprises a rigid frusto-conical cup or housing 98 which is fashioned with a pendant tubulation 100 that passes a conduit 102 from the housing 98 to be connected with a flexible tubing 104. The housing 98 also includes a medial transverse wall 106 which has a centrally dependent, blind bored boss 108 that receives the upper end of conduit 102 for aligning the conduit within the housing 98. The medial wall 106 of the housing 98 is also perforated to pass a lower tubular end portion 110 of each of the sniffing port elements 20 for selective connection with one of the capillary tubing sections from fitting 36 and with an outlet line from the manifold 96. The lower tubular end portion of the port element 20 may be provided with separate fittings for effluent sample and dilution air lines or a Y-fitting may be employed to make the respective connections. Each port element 20 is advantageously fabricated from high silica content glass and includes an intermediate body portion 112 and a fan-shaped upper end portion 114, the portion 114 having an outlet opening 116 which is disposed at the root of an outwardly flared and laterally narrowed channel 118. Slight rounding of the upper margins of the flared outlet channel 118 facilitates fitting thereof to the outer region of the nasal septum of a test panelist whereby to minimize possible sensory interference from spurious odorants in the test room atmosphere. While only one sniffing port element 20 is illustrated in FIG. 2, it is to be realized that two additional, equiangularly spaced port elements are desirably provided in each of the housings 98 for purposes of comparing a single, diluted effluent sample with two identical, control gas samples consisting of deodorized room air.

Adjacent each of the sniffing port elements 20 between the upper and lower ends of the housing 98 is mounted an electrical pushbutton switch 120; and each of the switches 120 is arranged to energize a corresponding signal lamp 122 arranged in an equipment module 124 as is shown in FIG. 1, an electrical lead 126 from the switch 120 to the corresponding signal lamp being led out of the housing 98 through the conduit 102 and the tubing 104, as is shown in FIG. 2. The switches 120 are arranged to complete an electrical circuit to the corresponding signal lamp upon the test panelist pressing the operating button of the switch, the button being biased into an open circuit condition so that the signal lamp is automatically deenergized upon release of the depressing pressure. Thus, no resetting of the switch is required. The use of the described signal lamp arrangement and encasement of the fluid lines as well as the electrical cables within a common line or tubing 104 facilitates a double-blind type of test procedure wherein neither the operator nor the panelist knows which of the ports is emitting effluent sample rather than control air.

In use of the apparatus 10, a test panel member will be situated on one side of a table 128 upon which the olfactometric apparatus is placed, as is shown in FIG. 1. The apparatus will be disposed so that the signal lamps 122 will be facing the test operator or moderator on the opposite side of the table. Effluent sample will be withdrawn from the container 12 by the pump 16 to be delivered to a selected one of the sniffing port elements 20 in each of the odor sampling units and at a selected dilution. The panelist will have been told in advance that one of the sniffing port elements in each of the housings 98 is different from the other two port elements and that this different port element may have an odor and the odor may be at or above the olfactory threshold level of the panelist. Since the odor sampling units are hand-held and joined to the remainder of the apparatus, by a flexible line, the three sniffing port elements in each sampling unit may be turned by the panelist at his will for odor comparison purposes.

When the test panelist has decided which of the three ports in a given sampling unit appears to be odorous, he will press the corresponding switch 120; and because the evaluation procedure forces the panelist to make a selection, he must decide or simply guess which is the odorous port. The panel moderator will observe and note the selection made by the panelist.

When the panel member is required to make successive determinations at different dilution levels, he will be directed to begin with the odor sampling unit presenting the highest dilution level and to proceed in the order of ascending concentration to the least diluted effluent sample presenting the strongest odor.

As noted hereinabove, the olfactometric apparatus 10 is arranged to operate on relatively small volumetric flows. Accordingly, a single bag container of sample effluent may supply the apparatus for several hours of operation. All of the members of a given test panel thus need not be present at the same time. This, in turn, simplifies the logistics of assembling a suitable test panel within a given organizational structure. Moreover, the relatively small volumes of flow required by the apparatus 10 promotes cleaning by flushing the various lines with deodorized air and replacing the tubing element 34 from the bag container 12 to and through the peristaltic pump 16.

The drawings and the foregoing descriptions are not intended to represent the only form of the invention in regard to the details of its construction and manner of operation. Changes in form and in the proportion of parts, as well as the substitution of equivalents, are contemplated as circumstances may suggest or render expedient; and although specific terms have been employed hereinabove, they are intended in a generic and descriptive sense only and not for the purposes of limitation, the scope of the invention being delineated in the following claims.

The invention is claimed as follows:

1. Apparatus for enhancing the smelling capability of a tester, comprising: container means for a fluid to be tested; odor sampling means including a plurality of spaced ports, each having a flared outlet shaped to accommodate the nostrils of a tester; first pump means connected to said container means and to said odor sampling means for delivering a first fluid to a first one of said ports; and second pump means connected to a second of said ports for delivering a second fluid thereto for comparison with said first fluid.

2. Apparatus according to claim 1 wherein said odor sampling means includes cup housing means for said ports, said cup housing means mounting said ports in equidistant relationship.

3. Apparatus according to claim 2 which further includes signalling means including a switch mounted in said cup housing means adjacent each of said ports.

4. Apparatus according to claim 1 which further includes flow control means between said first pump means and said first port.

5. Apparatus according to claim 4 wherein said flow control means includes a fixed orifice.

6. Apparatus according to claim 5 wherein said fixed orifice includes a capillary tube.

7. Apparatus according to claim 1 which further includes choice indicator means associated with each of said ports.

8. Apparatus according to claim 1 wherein said first pump means comprises a positive displacement pump.

9. Apparatus according to claim 8 wherein said positive displacement pump comprises a peristaltic pump.

10. Apparatus according to claim 8 which further includes drive means for operating said positive displacement pump continuously.

11. Apparatus according to claim 1 wherein said odor sampling means includes three sampling ports, two of said ports being connected to said second pump means.

* * * * *